UNITED STATES PATENT OFFICE.

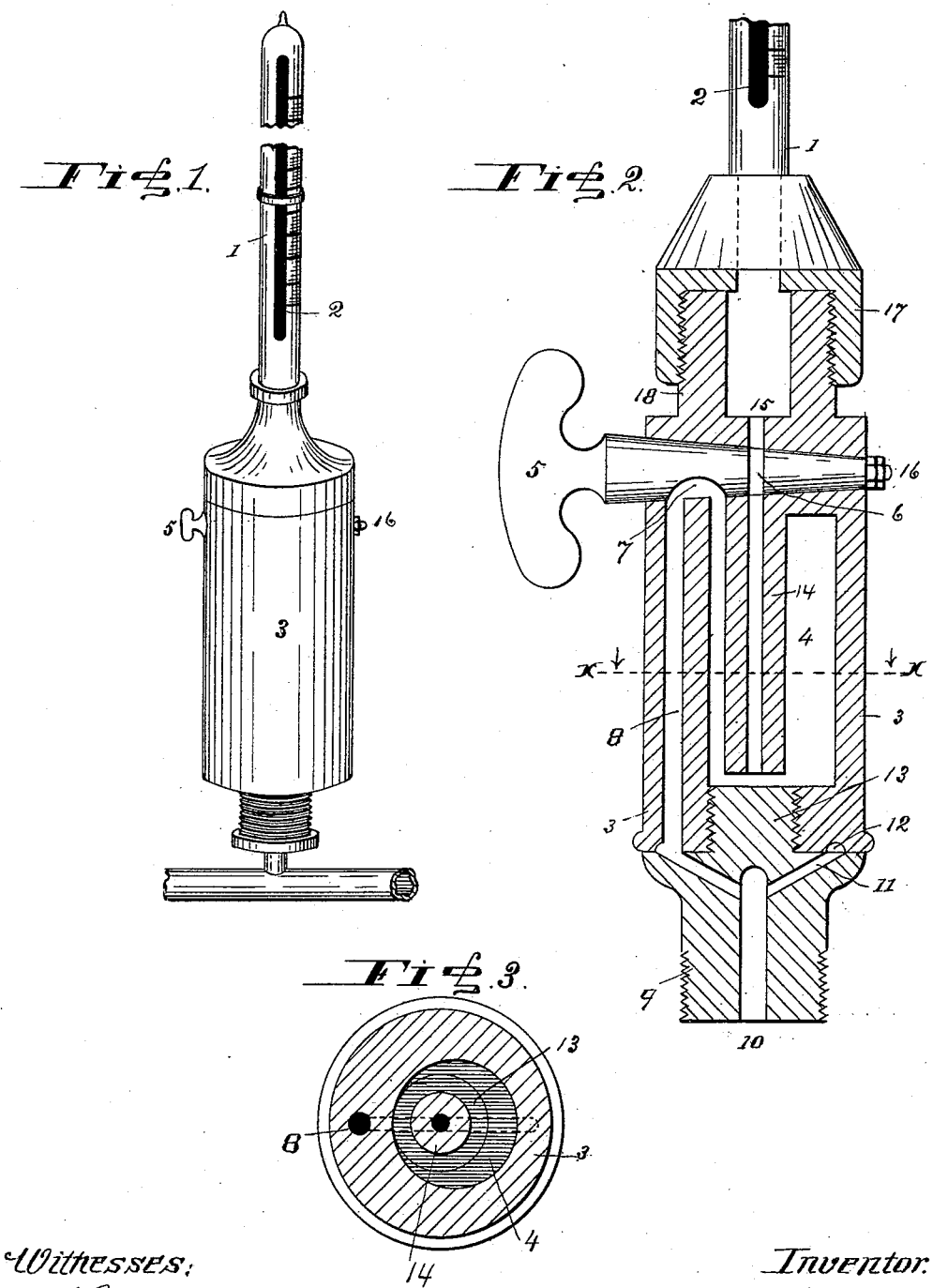

ORRANGE G. GUSS, OF LIMA, OHIO, ASSIGNOR OF ONE-HALF TO JOHN R. ASHTON, OF SAME PLACE.

PIPE-TESTING APPARATUS.

SPECIFICATION forming part of Letters Patent No. 394,974, dated December 25, 1888.

Application filed March 2, 1888. Serial No. 266,003. (No model.)

*To all whom it may concern:*

Be it known that I, ORRANGE G. GUSS, a citizen of the United States, and a resident of Lima, in the county of Allen and State of Ohio, have invented a new and useful Pipe-Testing Machine, of which the following is a specification.

My invention is an improved apparatus for testing gas, water, or other pipes and connections.

Figure 1 is a perspective view; Fig. 2, a perpendicular sectional view; Fig. 3, a horizontal sectional view through line $x\ x$.

1 is my mercury or indicating tube; 2, a lining of colored paper or other dark material behind the tube or in the glass; 3, my testing-cylinder; 4, a chamber for containing the mercury; 5, a perforated cock passing through the cylinder transversely; 6, a hole in the cock to admit the passage of the mercury from the chamber 4 to the mercury or indicating tube; 7, a rabbet in the side of the cock, opening into the mercury-chamber at one end and into the air-passage 8 at the other end; 9, a plug forming a connection for the air-pump; 10, air-passage therethrough; 11, air-passages from passage 10 into a groove, 12; 13, the plug screwing into the bottom part of the mercury-chamber; 14, a tube projecting down into the mercury-chamber and having the channel 15 through its length; 16, nut for tightening up and holding in position cock 5.

The operation is as follows: The chamber 4 in the cylinder 3 is filled with mercury by pouring it in through the hole 15, the cock 5 being turned so as to bring the hole 6 through it in line with the passage 15. The cock 5 is then turned so as to close the passage 15. The cap 17, having the mercury-tube 1 inserted in its upper end, is then screwed upon the part 18 of the cylinder. One tube or pipe from the air-pump is then attached to the pipe to be tested, and the other to the bottom 9 of the testing-cylinder. The cock 5 is then turned so as to bring the rabbet 7 over the mercury-chamber 4 and the air-passage 8 and the pumps set to work. As the air is pumped in, it passes up through openings 10 and 11 into the groove 12, up the tube 8, and through the rabbet 7 into the mercury-chamber 4, where the pressure exerted on top of the mercury forces it up the passage 15 into the tube 1. The pumping can be continued until the column in the tube indicates any desired amount of pressure in the pipes, when the pumping is suspended and the operator notes whether the mercury in the tube remains stationary or recedes. If it remains stationary, the pipes are considered as air-tight; but if it recedes there is a leak somewhere in the pipes, which must be found and attended to, when the pipes are again tested. After the test is completed the cylinder is detached from the air-pump, the mercury recedes into chamber 4, the cock 5 is turned to shut the air and mercury passages 8 and 15, and the tester is ready to be applied again at any point desired. Heretofore when an operator was ready for testing, the tester had to be taken apart, the mercury (carried in a flask) poured in, and the tester put together for use. Then after a test had been made the tester had to be taken apart again, and the mercury poured back into the bottle again for future use, all of which entailed the loss of much time, and more or less mercury always spilled and wasted while being changed.

By placing a piece of red, black, or other colored paper behind the mercury-tube or in the glass the operator can more readily see at a glance the height of the column of mercury while pumping.

What I claim is—

1. The testing-cylinder comprising the chamber 4, the air and mercury passages 8 and 15, and the retaining-cock 5, as and for the purpose set forth.

2. The cylinder 3, having the chamber 4, the air and mercury tubes 8 and 15, and the cock 5, having the rabbet 7 and hole 6, as and for the purpose set forth.

3. The cylinder 3, having therein the chamber 4, passages 8 and 15, the cock 5, the groove 12, and passages 10 and 11, as and for the purpose set forth.

ORRANGE G. GUSS.

Witnesses:
A. G. STEWART,
E. C. DAVIES.